US012625009B2

(12) United States Patent
Kakuyama et al.

(10) Patent No.: US 12,625,009 B2
(45) Date of Patent: May 12, 2026

(54) OPTICAL SENSOR

(71) Applicant: SUMITOMO ELECTRIC INDUSTRIES, LTD., Osaka (JP)

(72) Inventors: Kyohei Kakuyama, Osaka (JP); Kotaro Hirose, Osaka (JP); Masahiro Adachi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 314 days.

(21) Appl. No.: 18/378,159

(22) Filed: Oct. 10, 2023

(65) Prior Publication Data

US 2024/0125651 A1 Apr. 18, 2024

(30) Foreign Application Priority Data

Oct. 11, 2022 (JP) ................................. 2022-163187

(51) Int. Cl.
*G01J 5/12* (2006.01)
(52) U.S. Cl.
CPC ...................................... *G01J 5/12* (2013.01)
(58) Field of Classification Search
None
See application file for complete search history.

(56) References Cited

U.S. PATENT DOCUMENTS

| | | | | |
|---|---|---|---|---|
| 5,453,629 A | * | 9/1995 | Gofuku | H10F 39/197 |
| | | | | 257/17 |
| 6,348,650 B1 | * | 2/2002 | Endo | G01J 5/12 |
| | | | | 136/224 |
| 2008/0242772 A1 | * | 10/2008 | Nakamura | C08J 5/042 |
| | | | | 524/70 |
| 2012/0273790 A1 | * | 11/2012 | Aoyama | H10D 30/0321 |
| | | | | 438/303 |
| 2022/0155141 A1 | * | 5/2022 | Hirose | H10N 10/851 |

FOREIGN PATENT DOCUMENTS

| | | | | |
|---|---|---|---|---|
| JP | 2000-340848 A | 12/2000 | | |
| WO | WO-2020213569 A1 | * | 10/2020 | G01J 1/0252 |

* cited by examiner

*Primary Examiner* — Erica S Lin
(74) *Attorney, Agent, or Firm* — XSENSUS LLP

(57) ABSTRACT

An optical sensor includes a support layer, a thermoelectric-conversion material section disposed on the support layer and including strip-shaped p-type material layers configured to convert thermal energy into electric energy and strip-shaped n-type material layers configured to convert thermal energy into electric energy, a heat sink, a light absorbing film, and an insulating film disposed between the thermo-electric-conversion material section and the light absorbing film. Each of the p-type material layers includes a first region overlapping the heat sink and a second region overlapping the light absorbing film. Each of the n-type material layers includes a third region overlapping the heat sink and a fourth region overlapping the light absorbing film. The p-type material layers and the n-type material layers are alternately disposed in series. The light absorbing film includes 60 mass % to 95 mass % of carbon and 5 mass % to 40 mass % of a resin.

11 Claims, 4 Drawing Sheets

OPTICAL SENSOR

CROSS-REFERENCE TO RELATED APPLICATION

This application claims priority based on Japanese Patent Application No. 2022-163187, filed on Oct. 11, 2022, the entire contents of which are incorporated herein by reference.

TECHNICAL FIELD

The present disclosure relates to an optical sensor.

BACKGROUND

A technique related to a thermopile-type infrared sensor using a thermoelectric conversion material for converting a temperature difference (thermal energy) into electric energy is known (see, for example, Japanese Patent Application Laid-Open No. 2000-340848). The infrared sensor includes a light receiving portion (light absorbing film) that is configured to convert optical energy into thermal energy and a thermoelectric conversion section (thermopile) that is configured to convert a temperature difference (thermal energy) into electric energy. In the thermoelectric conversion section, a thermocouple is used, which a p-type thermoelectric conversion material and an n-type thermoelectric conversion material are connected to each other to form. A plurality of the p-type thermoelectric conversion materials and a plurality of the n-type thermoelectric conversion materials are alternately connected in series to each other to increase an output.

SUMMARY

An optical sensor according to the present disclosure includes a support layer having a first main surface and a second main surface located opposite the first main surface in a thickness direction; a thermoelectric-conversion material section disposed on the first main surface and including a plurality of p-type material layers and a plurality of n-type material layers; a heat sink disposed on the second main surface and having a recess on an inner side as viewed in a direction perpendicular to the first main surface; a light absorbing film disposed so as to overlap the recess as viewed in the direction perpendicular to the first main surface; and an insulating film disposed between the thermoelectric-conversion material section and the light absorbing film. Each of the plurality of p-type material layers has a strip shape, is formed of SiGe having p-type conductivity, and is configured to convert thermal energy into electric energy. Each of the plurality of n-type material layers has a strip shape, is formed of SiGe having n-type conductivity, and is configured to convert thermal energy into electric energy. Each of the plurality of p-type material layers includes a first region overlapping the heat sink and a second region overlapping the light absorbing film as viewed in the direction perpendicular to the first main surface. Each of the plurality of n-type material layers includes a third region overlapping the heat sink and a fourth region overlapping the light absorbing film as viewed in the direction perpendicular to the first main surface. The plurality of p-type material layers and the plurality of n-type material layers are alternately disposed in series such that the first regions are electrically connected to the third regions and the second regions are electrically connected to the fourth regions. The light absorbing film includes of 60 mass % to 95 mass % of carbon and 5 mass % to 40 mass % of a resin.

DETAILED DESCRIPTION

Figure 1:
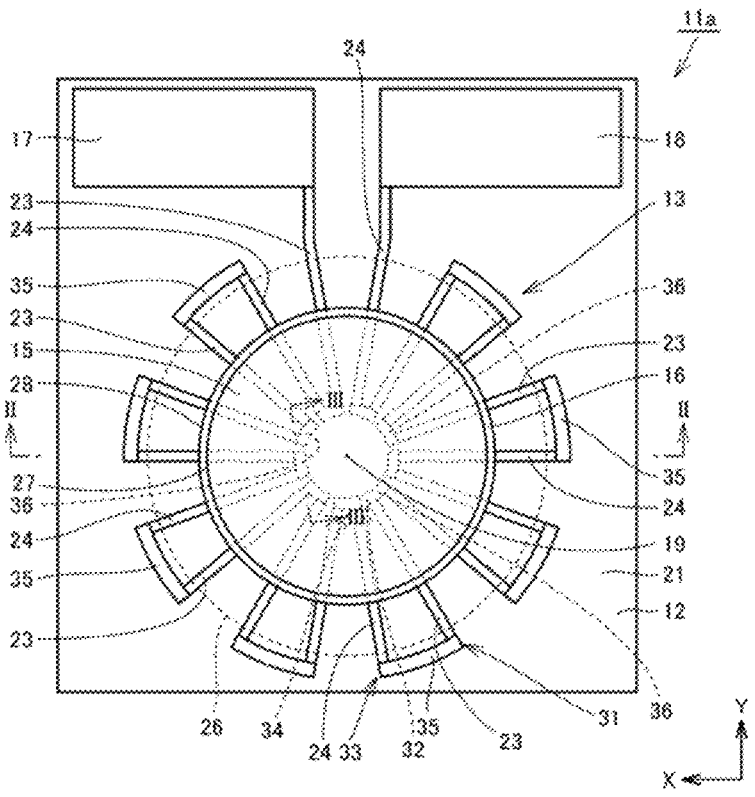
FIG. 1 is a schematic plan view of an appearance of an optical sensor according to a first embodiment.

In an optical sensor, a temperature difference is formed depending on light received by a light absorbing film, and this temperature difference (thermal energy) is converted into electric energy. The optical sensor is required to have an improved sensitivity.

Therefore, an object of the present disclosure is to provide an optical sensor having an improved sensitivity.

First, embodiments of the present disclosure will be listed and described.

(1) An optical sensor according to the present disclosure includes a support layer having a first main surface and a second main surface located opposite the first main surface in a thickness direction, a thermoelectric-conversion material section disposed on the first main surface and including a plurality of p-type material layers and a plurality of n-type material layers; a heat sink disposed on the second main surface and having a recess on an inner side as viewed in a direction perpendicular to the first main surface; a light absorbing film disposed so as to overlap the recess as viewed in the direction perpendicular to the first main surface; and an insulating film disposed between the thermoelectric-conversion material section and the light absorbing film. Each of the plurality of p-type material layers has a strip shape, is formed of SiGe having p-type conductivity, and is configured to convert thermal energy into electric energy. Each of the plurality of n-type material layers has a strip shape, is formed of SiGe having n-type conductivity, and is configured to convert thermal energy into electric energy. Each of the plurality of p-type material layers includes a first region overlapping the heat sink and a second region overlapping the light absorbing film as viewed in the direction perpendicular to the first main surface. Each of the plurality of n-type material layers includes a third region overlapping the heat sink and a fourth region overlapping the light absorbing film as viewed in the direction perpendicular to the first main surface. The plurality of p-type material layers and the plurality of n-type material layers are alternately disposed in series such that the first regions are electrically connected to the third regions and the second regions are electrically connected to the fourth regions. The light absorbing film includes of 60 mass % to 95 mass % of carbon and 5 mass % to 40 mass % of a resin. Note that "the second regions are electrically connected to the fourth regions" means that the second regions are electrically connected to the fourth regions to an extent that there is no potential difference therebetween.

A thermopile-type optical sensor using a thermoelectric conversion material that converts a temperature difference (thermal energy) into electric energy, such as an infrared sensor, may include a light absorbing film that is configured to convert optical energy into thermal energy, and a thermoelectric-conversion material section (thermopile) that is configured to convert thermal energy into electric energy. In the thermoelectric-conversion material section, for example, a thermocouple may be used which a p-type thermoelectric conversion material and an n-type thermoelectric conversion material are connected to each other to form. A plurality of p-type thermoelectric conversion materials having strip shapes and a plurality of n-type thermoelectric conversion materials having strip shapes are alternately connected to each other in series to increase an output. A sensitivity in the optical sensor is expressed by the following equation shown in Math. 1.

$$D* = \frac{\eta \times n \times \alpha}{Gth} \qquad \text{[Math. 1]}$$

D* represents a sensitivity, q represents an emissivity, n represents the number of pairs of thermocouples, a represents a Seebeck coefficient, and Gth represents a thermal conductance. As can be understood from this equation, the sensitivity of the optical sensor can be improved by reducing the thermal conductance.

The present inventors have considered to increase the temperature difference which is nearly equal to an inverse of the thermal conductance in order to reduce the thermal conductance. As for the light absorbing film forming a temperature difference in the thermoelectric-conversion material section among the components included in the optical sensor, it was found that when a thermal conductivity of the light absorbing film is high, the temperature difference formed in the thermoelectric-conversion material section becomes small. That is, when the thermal conductivity of the light absorbing film is high, in a region of the thermoelectric-conversion material section which overlap the light absorbing film and have a high temperature, temperature is the same over the region, and thus it is difficult to form a temperature difference. Accordingly, the present inventors have made intensive studies focusing on this point, and have arrived at the configuration of the present disclosure.

According to the optical sensor of the present disclosure, the light absorbing film includes 60 mass % to 95 mass % of carbon (C) and 5 mass % to 40 mass % of a resin. Since the light absorbing film having such a configuration includes the resin at a content ratio of 5 mass % to 40 mass %, the thermal conductivity can be reduced. Thus, a large temperature difference can be formed in each of regions overlapping the light absorbing film in the plurality of p-type material layers and the plurality of n-type material layers. Therefore, a large temperature difference can be formed in each of the plurality of strip-shaped p-type material layers and each of the plurality of strip-shaped n-type material layers as a whole. In this case, since the insulating film is disposed between the thermoelectric-conversion material section and the light absorbing film, insulation between the thermoelectric-conversion material section and the light absorbing film can be secured. In addition, the performance required for the light absorbing film includes a high light absorptance. The light absorbing film having the above-described configuration includes 60 mass % to 95 mass % of carbon, thereby achieving a high light absorptance. That is, the light absorbing film having the above-described configuration can achieve a high light absorptance while reducing a thermal conductivity. As described above, according to the optical sensor having the above-described configuration, since a large temperature difference can be formed in the thermoelectric-conversion material section, the sensitivity of the optical sensor can be improved.

(2) In the above (1), the light absorbing film may have a thermal conductivity of 1 W/mK or less. In such an optical sensor, a large temperature difference can be more reliably formed, so that the sensitivity can be further improved.

(3) In the above (1) or (2), the resin may include an epoxy resin. In such an optical sensor, a low thermal conductivity and a high light absorptance in the light absorbing film may be more reliably achieved, so that the sensitivity can be further improved.

(4) In any one of the above (1) to (3), the light absorbing film may have a thickness of 2 μm to 7 μm. This prevents the light absorbing film from becoming excessively thick more than necessary while reliably maintaining the performance of light absorption of the light absorbing film, thereby more reliably achieving a large temperature difference.

(5) In any one of the above (1) to (4), the light absorbing film may have a circular outer shape as viewed in the direction perpendicular to the first main surface. The plurality of p-type material layers and the plurality of n-type material layers may be radially disposed. This allows the plurality of p-type material layers and the plurality of n-type material layers to be disposed so as to form large temperature differences while effectively utilizing a space in accordance with the outer shape of the light absorbing film. Therefore, the sensitivity of the optical sensor can be more efficiently improved.

(6) In the above (5), the second regions and the fourth regions may be located in a region of 30% or more and 80% or less of a radius of the light absorbing film from the center of the light absorbing film in the radial direction. This allows formation of large temperature differences in the longitudinal directions of the strip-shaped p-type material layers including the regions overlapping the light absorbing film and the longitudinal directions of the strip-shaped n-type material layers including the regions overlapping the light absorbing film. Therefore, the sensitivity can be further improved.

(7) In any one of the above (1) to (4), the light absorbing film may have a rectangular outer shape as viewed in the direction perpendicular to the first main surface. The plurality of p-type material layers and the plurality of n-type material layers may be disposed such that longitudinal directions thereof are parallel to a direction in which a side of the light absorbing film extends or to a direction perpendicular to the direction in which the side of the light absorbing film extends. This allows a region on the first main surface to be effectively utilized to form large temperature differences in the longitudinal directions of the strip-shaped p-type material layers and the longitudinal directions of the strip-shaped n-type material layers in a case where the support layer has a rectangular shape as viewed in the direction perpendicular to the first main surface. Therefore, the sensitivity can be further improved.

(8) In any one of the above (1) to (7), the first regions may be electrically connected to the third regions through first connection portions having conductivity, and the second regions may be electrically connected to the fourth regions through second connection portions having conductivity. This allows the p-type material layers and the n-type material layers to be reliably electrically connected to each other by the first connection portions and the second connection portions. Furthermore, since the p-type material layers and the n-type material layers are configured not to overlap each other, the p-type material layers and the n-type material layers can be easily formed by deposition or the like in a same step. Therefore, productivity can be improved.

(9) In any one of the above (1) to (7), the first regions of the plurality of p-type material layers and the third regions of the plurality of n-type material layers may overlap each other as viewed in the direction perpendicular to the first main surface and may be connected in ohmic contact with each other. The second regions of the plurality of p-type material layers and the fourth regions of the plurality of n-type material layers may overlap each other as viewed in the direction perpendicular to the first main surface and may be connected in ohmic contact with each other. In this manner, the p-type material layers and the n-type material layers can be easily disposed in a concentrated manner on the first main surface without interposing a member between the p-type material layers and the n-type material layers. Therefore, the number of p-type material layers and the number of n-type material layers can be increased to facilitate an increase in the output.

(10) In any one of the above (1) to (9), the plurality of p-type material layers, the plurality of n-type material layers, or both the plurality of p-type material layers and the plurality of n-type material layers may include SiGe having at least one of a nanocrystal structure having a grain size of 3 nm to 200 nm or an amorphous structure. This allows the thermoelectric conversion efficiency to be improved. Therefore, the sensitivity can be improved.

(11) In any one of the above (1) to (9), the SiGe may be a polycrystal. Such a polycrystalline SiGe is also suitably used in the optical sensor of the present disclosure. A crystallization rate of the polycrystal in the present disclosure is 99% or more.

DETAILS OF EMBODIMENTS OF PRESENT DISCLOSURE

Next, embodiments of the optical sensor according to the present disclosure will be described with reference to the drawings. In the following drawings, the same or corresponding portions are denoted by the same reference numerals, and description thereof will be omitted.

First Embodiment

Figure 2:
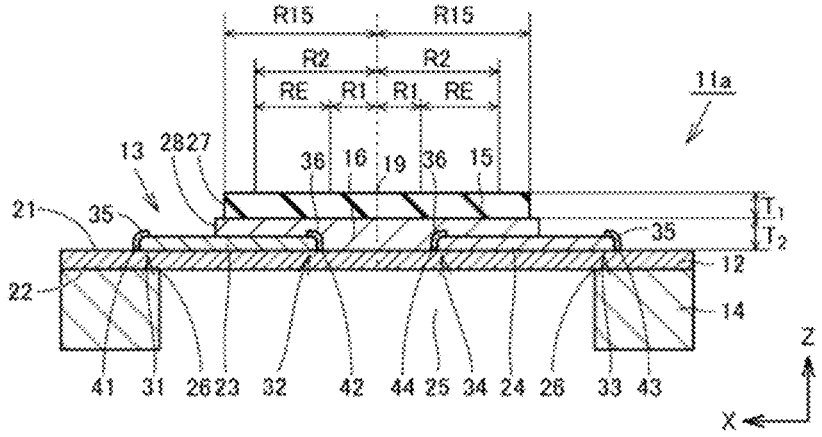
FIG. 2 is a schematic cross-sectional view of the optical sensor according to the first embodiment showing a cross-section taken along line II-II in FIG. 1.
Figure 3:
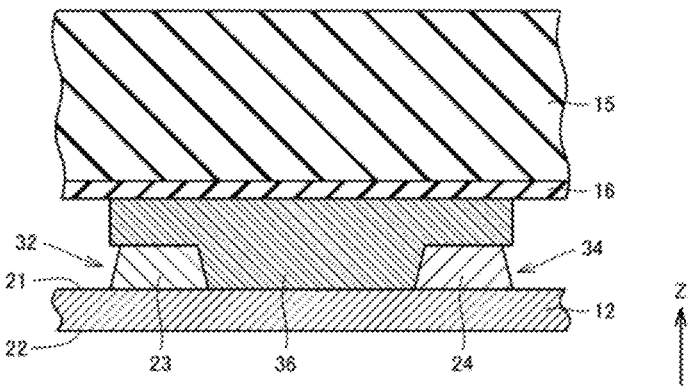
FIG. 3 is a schematic cross-sectional view of a portion of the optical sensor showing a cross-section taken along line II-III in the optical sensor according to the first embodiment shown in FIG. 1.

A configuration of an optical sensor according to a first embodiment of the present disclosure will be described. FIG. 1 is a schematic plan view of an appearance of the optical sensor according to the first embodiment. FIG. 2 is a schematic cross-sectional view of the optical sensor according to the first embodiment showing a cross-section taken along line II-II in FIG. 1. FIG. 3 is a schematic cross-sectional view of a portion of the optical sensor showing a cross section taken along line III-III in the optical sensor according to the first embodiment shown in FIG. 1.

Referring to FIGS. 1, 2 and 3, an optical sensor 11a is, for example, an infrared sensor. Optical sensor 11a includes a support layer 12, a thermoelectric-conversion material section 13, a heat sink 14, an infrared absorbing film 15 as a light absorbing film, an insulating film 16, a first electrode 17, and a second electrode 18. Support layer 12 is a thin layer. In the present embodiment, support layer 12 has a rectangular shape as viewed in a thickness direction. Specifically, a length of support layer 12 in a Y direction is longer than a length of support layer 12 in an X direction. The X direction and the Y direction are directions orthogonal to a Z direction which is the thickness direction of support layer 12. The X direction and the Y direction are orthogonal to each other.

Support layer 12 has a first main surface 21 and a second main surface 22. First main surface 21 is located on one side of support layer 12 in the thickness direction, and second main surface 22 is located opposite first main surface 21 in the thickness direction, that is, on the other side of support layer 12 in the thickness direction. That is, first main surface 21 and second main surface 22 are disposed so as to be spaced apart from each other in the Z direction which is the thickness direction of support layer 12. As a material of support layer 12, for example, $SiO_2$ (silicon dioxide) or SiN (silicon nitride) is selected.

Thermoelectric-conversion material section 13 is configured to convert thermal energy (temperature difference) into electric energy. Thermoelectric-conversion material section 13 is disposed on support layer 12, specifically on first main surface 21. Thermoelectric-conversion material section 13 includes a plurality of p-type material layers 23 that each have a strip shape and a plurality of n-type material layers 24 that each have a strip shape. P-type material layers 23 are formed of SiGe (silicon germanium) having p-type conductivity. N-type material layers 24 are formed of SiGe (silicon germanium) having n-type conductivity. One layer of p-type material layers 23 and one layer of n-type material layers 24 are paired to form a thermocouple. In the present embodiment, nine p-type material layers 23 and nine n-type material layers 24 are included in thermoelectric-conversion material section 13. However, the number of p-type material layers 23 and the number of n-type material layers 24 are not limited to these numbers, and may be determined as desired according to a required function, application, or the like. The configurations of the plurality of p-type material layers 23 and the plurality of n-type material layers 24 will be described in detail later.

Heat sink 14 is disposed on support layer 12, specifically on second main surface 22. Heat sink 14 is configured to be sufficiently thicker than support layer 12 and the like. Heat sink 14 has a recess 25 formed on an inner side as viewed in the Z direction perpendicular to first main surface 21. As indicated by the dashed line in FIG. 1, an edge 26 of recess 25 is circular as viewed in the Z direction. Recess 25 is located so as to form temperature differences in longitudinal directions of strip-shaped p-type material layers 23 and longitudinal directions of strip-shaped n-type material layer 24 which are disposed on first main surface 21 of support layer 12, together with infrared absorbing film 15 described later. For example, Si (silicon) is selected as a material of heat sink 14. That is, heat sink 14 is formed of a silicon substrate.

Infrared absorbing film 15 is disposed so as to overlap recess 25 as viewed in a direction perpendicular to first main surface 21. That is, infrared absorbing film 15 is disposed so as to overlap recess 25 as viewed in the Z direction which is a direction perpendicular to first main surface 21. Infrared absorbing film 15 is disposed within recess 25 as viewed in the Z direction. An outer edge 27 of infrared absorbing film 15 is circular as viewed in the Z-direction. A diameter of outer edge 27 of infrared absorbing film 15 is smaller than a diameter of edge 26 of recess 25. The configuration of infrared absorbing film 15 will be described in detail later.

Insulating film 16 is disposed between thermoelectric-conversion material section 13 and infrared absorbing film 15. Insulating film 16 is configured to ensure insulation between thermoelectric-conversion material section 13 and infrared absorbing film 15. An outer edge 28 of insulating film 16 has a circular shape as viewed in the Z direction, as is outer edge 27 of infrared absorbing film 15. A diameter of outer edge 28 of insulating film 16 is slightly larger than the diameter of outer edge 27 of infrared absorbing film 15. In FIG. 1 and other figures, difference between outer edge 27 of infrared absorbing film 15 and outer edge 28 of insulating film 16 is shown exaggeratedly large. Specifically, a radius of insulating film 16 is about 5 nm larger than a radius R15 of infrared absorbing film 15. For example, $SiO_2$ is selected as a material of insulating film 16. In addition, insulating film 16 may have a thickness of 10 nm to 300 nm.

First electrode 17 and second electrode 18 are disposed on first main surface 21 of support layer 12. First electrode 17 and second electrode 18 are disposed so as to be spaced apart from each other in the X direction. First electrode 17 and second electrode 18 are so-called pad electrodes. First electrode 17 is connected to one of p-type material layers 23. Specifically, first electrode 17 is electrically connected to an endmost one of p-type material layers 23 among p-type material layers 23 and n-type material layers 24 which are alternately connected in series as described later. Second electrode 18 is connected to one of n-type material layers 24. Specifically, second electrode 18 is electrically connected to an endmost one of n-type material layers 24 among p-type material layers 23 and n-type material layers 24 which are alternately connected in series. For example, Au (gold), Ti (titanium), and Pt (platinum) are selected as materials for first electrode 17 and second electrode 18.

Next, a specific configuration of thermoelectric-conversion material section 13 will be described. Each of the plurality of p-type material layers 23 includes a first region 31 overlapping heat sink 14 and a second region 32 overlapping infrared absorbing film 15 in the direction perpendicular to first main surface 21. First region 31 includes a first end portion 41 located at one side in the longitudinal direction of each of the p-type material layers. Second region 32 includes a second end portion 42 located at the other side in the longitudinal direction of each of the p-type material layers. Each of the plurality of n-type material layers includes a third region 33 overlapping heat sink 14 and a fourth region 34 overlapping infrared absorbing film 15 as viewed in the direction perpendicular to first main surface 21. As described below, first region 31 and third region 33 overlap heat sink 14 as viewed in the direction perpendicular to first main surface 21, and are electrically connected to each other. Second region 32 and fourth region 34 overlap infrared absorbing film 15 as viewed in the direction perpendicular to first main surface 21, and are electrically connected to each other. Third region 33 includes a third end portion 43 located at one side in the longitudinal direction of each of n-type material layers 24.

Fourth region 34 includes a fourth end portion 44 located at the other side in the longitudinal direction of each of n-type material layers 24.

In the present embodiment, p-type material layers 23 and n-type material layers 24 are radially disposed. That is, p-type material layers 23 and n-type material layers 24 are disposed such that the longitudinal directions of p-type material layers 23 and n-type material layers 24 extend radially from a center 19 of infrared absorbing film 15. Specifically, when viewed in the Z direction, first regions 31 of p-type material layers 23 and third regions 33 of n-type material layers 24 are disposed at outer ends of the respective material layers, and second regions 32 of p-type material layers 23 and fourth regions 34 of n-type material layers 24 are disposed at inner ends of the respective material layers. Further, p-type material layers 23 and n-type material layers 24 are alternately disposed at intervals in a circumferential direction.

In addition, thermoelectric-conversion material section 13 includes a plurality of first connection portions 35 having conductivity and a plurality of second connection portions 36 having conductivity. First connection portions 35 and second connection portions 36 are arc-shaped as viewed in the Z direction. First connection portions 35 connect first regions 31 to third regions 33 at outer ends of the material layers. In other words, first regions 31 and third regions 33 are electrically connected through first connection portions 35. Second connection portions 36 connect second regions 32 to fourth regions 34 at inner ends of the material layers. In other words, second regions 32 and fourth regions 34 are electrically connected through second connection portions 36. As materials for first connection portions 35 and second connection portions 36, for example, the same materials as those for first electrode 17 and second electrode 18 are selected. First regions 31 and third regions 33 are in ohmic contact with first connection portions 35. In this manner, first regions 31 and third regions 33 are electrically connected to each other. Second regions 32 and fourth regions 34 are in ohmic contact with second connection portions 36. Thus, second regions 32 and fourth regions 34 are electrically connected to each other.

First regions 31 of the plurality of p-type material layers 23 and third regions 33 of the plurality of n-type material layers 24 are electrically connected through first connection portions 35. In addition, second regions 32 of the plurality of p-type material layers 23 and fourth regions 34 of the plurality of n-type material layers 24 are electrically connected through second connection portions 36. In this manner, the plurality of p-type material layers 23 and the plurality of n-type material layers 24 are alternately disposed in series. The endmost one of p-type material layers 23 among the plurality of p-type material layers 23 and the plurality of n-type material layers 24 is electrically connected to first electrode 17. The endmost one of n-type material layers 24 among the plurality of p-type material layers 23 and the plurality of n-type material layers 24 is electrically connected to second electrode 18. First electrode 17 and second electrode 18 are electrically connected to the outside.

Here, a specific configuration of infrared absorbing film 15 will be described. Infrared absorbing film 15 includes 60 mass % to 95 mass % of carbon and 5 mass % to 40 mass % of a resin. In the present embodiment, infrared absorbing film 15 includes 85 mass % carbon and 15 mass % resin. As a specific resin, for example, an epoxy resin is selected. Infrared absorbing film 15 has a thermal conductivity of 1 W/mK or less. In the present embodiment, infrared absorbing film 15 has a thermal conductivity of 0.6 W/mK. Infrared absorbing film 15 has a thickness $T_1$ of 2 μm to 7 μm. In the present embodiment, infrared absorbing film 15 has a thickness $T_1$ of 5 μm.

As shown in FIG. 2, second regions 32 of p-type material layers 23 and fourth regions 34 of n-type material layers 24 are located in a region RE which is a region of 30% or more and 80% or less of radius R15 of infrared absorbing film 15 from center 19 of infrared absorbing film 15 in a radial direction. In the present embodiment, second regions 32 and fourth regions 34 are located at 50% of radius R15 of infrared absorbing film 15 from center 19 of infrared absorbing film 15 in the radial direction. In FIG. 2, 30% of radius R15 is indicated by an arrow R1 and 80% of radius R15 is indicated by an arrow R2.

Such optical sensor 11a can be manufactured, for example, as follows. Hereinafter, a method of manufacturing optical sensor 11a having the above-described configuration will be briefly described. First, a silicon substrate is prepared, and a SiO₂ or SiN film serving as support layer 12 is formed on the silicon substrate. Thereafter. SiGe forming p-type material layers 23 and n-type material layers 24 included in thermoelectric-conversion material section 13 is deposited. First connection portions 35 and second connection portions 36 are deposited to electrically connect p-type material layers 23 and n-type material layers 24 to each other. As a material for first connection portions 35 and second connection portions 36, for example, Ni (nickel), Ti (titanium), or Au (gold) are selected. Thereafter, insulating film 16 is formed of SiO₂, and infrared absorbing film 15 is formed. To form infrared absorbing film 15, first, a black resist is prepared and applied by a spin coater to form a film. The black resist is prepared as follows. Various components such as a solvent are blended so as to finally leave infrared absorbing film 15 including 60 mass % to 95 mass % of carbon and 5 mass % to 40 mass % of a resin. In this case, for example, a bisphenol A type epoxy resin may be used as the epoxy resin. After the film formation, the film is exposed using a photolithography apparatus and immersed in a developing solution to form a black resist pattern. In this case, the black resist pattern is formed such that the outer shape has a circular shape. Finally, post-baking is performed to complete the film formation. Thereafter, first electrode 17, second electrode 18 and the like are formed, and the silicon substrate is etched so as to penetrate through the silicon substrate and reach support layer 12 to form recess 25 and the like, thereby forming heat sink 14. In this manner, optical sensor 11a having the above-described configuration is manufactured.

According to optical sensor 11a, infrared absorbing film 15 includes 60 mass % to 95 mass % of carbon and 5 mass % to 40 mass % of a resin. Infrared absorbing film 15 having such a configuration includes the resin at a content ratio of 5 mass % to 40 mass %, so that the thermal conductivity can be reduced. Thus, large temperature differences can be formed in regions overlapping infrared absorbing film 15, specifically, second regions 32 and fourth regions 34, in the plurality of p-type material layers 23 and the plurality of n-type material layers 24. Therefore, a large temperature difference can be formed in each of the plurality of strip-shaped p-type material layers 23 and each of the plurality of strip-shaped n-type material layers 24 as a whole. In this case, since insulating film 16 is disposed between thermo-electric-conversion material section 13 and infrared absorbing film 15, insulation between thermoelectric-conversion material section 13 and infrared absorbing film 15 can be secured. In addition, the performance required for infrared absorbing film 15 includes a high light absorptance. Infrared absorbing film 15 having the above-described configuration includes 60 mass % to 95 mass % of carbon, thereby achieving a high light absorptance. That is, infrared absorbing film 15 having the above-described configuration can achieve a high light absorptance while reducing a thermal conductivity. As described above, according to optical sensor 11a having the above-described configuration, since a large temperature difference can be formed in thermoelectric-conversion material section 13, the sensitivity of optical sensor 11a can be improved.

Under a condition that infrared absorbing film 15 in optical sensor 11a having the above-described configuration has a thickness of 3 μm or more, infrared absorbing film has a thermal conductivity of 0.6 W/mK, which indicates that a low thermal conductivity is achieved. In addition, a light absorptance (emissivity) in a wavelength range of 8 μm to 12 μm is 80%, which indicates that a high light absorptance is maintained. On the other hand, in a case of an infrared absorbing film using only carbon, an optical absorptance can be maintained at a high level of 80%, but a thermal conductivity is 150 W/mK, which is very high. According to such an infrared absorbing film, temperature differences cannot be formed in regions overlapping the infrared absorbing film in the p-type material layers and the n-type material layers, and as a result, it is difficult to form large temperature differences. In contrast, when SiO₂ is used as the infrared absorbing film, the infrared absorbing film has a thermal conductivity of 1.4 W/mK, maintaining a low thermal conductivity, but a light absorptance is 30%, which is a very low value. As described above, optical sensor 11a according to the first embodiment of the present disclosure can ensure a low thermal conductivity and a high optical absorptance of infrared absorbing film 15 to improve the sensitivity of optical sensor 11a.

In the present embodiment, infrared absorbing film 15 has a thermal conductivity of 1 W/mK or less. Such optical sensor 11a can more reliably form large temperature differences to further improve the sensitivity.

In the present embodiment, the resin includes an epoxy resin. Such optical sensor 11a can more reliably achieve a low thermal conductivity and a high optical absorptance of infrared absorbing film 15, so that the sensitivity can be more reliably improved.

In the present embodiment, infrared absorbing film 15 has a thickness of 2 μm to 7 μm. This prevents infrared absorbing film 15 from becoming excessively thick more than necessary while reliably maintaining the performance of light absorption of infrared absorbing film 15, thereby more reliably achieving large temperature differences.

In the present embodiment, infrared absorbing film 15 has the circular outer shape as viewed in the direction perpendicular to first main surface 21. P-type material layers 23 and n-type material layers 24 are radially disposed. This allows the plurality of p-type material layers 23 and the plurality of n-type material layers 24 to be disposed so as to form large temperature differences while effectively utilizing a space in accordance with the outer shape of infrared absorbing film 15. Therefore, the sensitivity of optical sensor 11a can be more efficiently improved.

In the present embodiment, first regions 31 of the plurality of p-type material layers 23 and third regions 33 of the plurality of n-type material layers 24 are electrically connected to each other through first connection portions 35 having conductivity. Second regions 32 of the plurality of p-type material layers 23 and fourth regions 34 of the plurality of n-type material layers 24 are electrically connected to each other through second connection portions 36 having conductivity. Therefore, p-type material layers 23 and n-type material layers 24 can be reliably connected to each other by first connection portions 35 and second connection portions 36. In addition, since p-type material layers 23 and n-type material layers 24 are configured not to overlap each other, p-type material layers 23 and n-type material layers 24 can be easily formed by deposition or the like in a same process. Therefore, productivity can be improved.

In the present embodiment, second regions 32 and fourth regions 34 are located in region RE which is a region of 30% or more and 80% or less of radius R15 of infrared absorbing film 15 from center 19 of infrared absorbing film 15 in a radial direction. Second end portion 42 and fourth end portion 44 are located at a distance of 30% or more and 80% or less of radius R15 of infrared absorbing film 15 from center 19 of infrared absorbing film 15 in the radial direction. Therefore, large temperature differences can be formed in the longitudinal directions of strip-shaped p-type material layers 23 and the longitudinal directions of strip-shaped n-type material layers 24, so that the sensitivity can be further improved.

Figure 4:
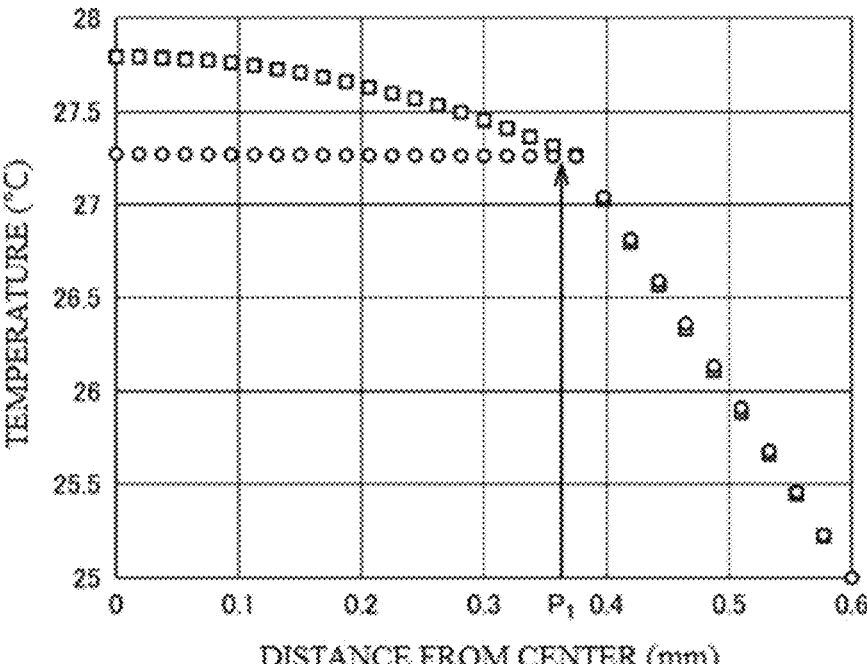
FIG. 4 is a graph showing a relationship between a temperature and a distance from a center in the optical sensor according to the first embodiment and in an optical sensor using only carbon as an infrared absorbing film.

Here, the relationship between a temperature and a distance from a center in the optical sensor according to the first embodiment and in an optical sensor using only carbon as the infrared absorbing film will be described. FIG. 4 is a graph showing the relationship between the temperature and the distance from the center in the optical sensor according to the first embodiment and in the optical sensor using only carbon as the infrared absorbing film. In FIG. 4, a horizontal axis represents the distance (mm) from the center of the infrared absorbing film, and a vertical axis represents the temperature (° C.). In FIG. 4, open circles represent data points for the optical sensor in which the infrared absorbing film is formed of only carbon, and open squares represent data points for the optical sensor according to the first embodiment. The infrared absorbing film is disposed so as to extend from center 19 to a position having a distance of 0.38 mm from the center indicated by the dashed line. That is, a diameter of the infrared absorbing film is 0.76 mm.

Referring to FIG. 4, in the case where the infrared absorbing film is formed of only carbon, the temperature is constant at 27.3° C. from the center to a position Pi whose distance from the center is 0.38 mm. That is, due to a high thermal conductivity, a temperature difference cannot be formed in an region extending from the center to a distance of 0.38 mm, and even in a case where the p-type material layers and the n-type material layers are disposed to overlap the infrared absorbing film in this region, a temperature difference cannot be formed in the longitudinal direction of each of the material layers. On the other hand, the optical sensor according to the first embodiment of the present disclosure has the infrared absorbing film whose thermal conductivity is low, thereby forming temperature differences. Specifically, the temperature is about 27.8° C. at the center of the infrared absorbing film, and the temperature decreases outward from the center to be 27.3° C. at a position having a distance of 0.38 mm from the center which corresponds to the position of the outer edge of the infrared absorbing film. Therefore, temperature differences are also formed in the regions overlapping the infrared absorbing film. The above-described region is effectively utilized to widely secure the regions in which the p-type material layers and the n-type material layers overlap the infrared absorbing film, and large temperature differences in the longitudinal directions thereof can be achieved.

Figure 5:
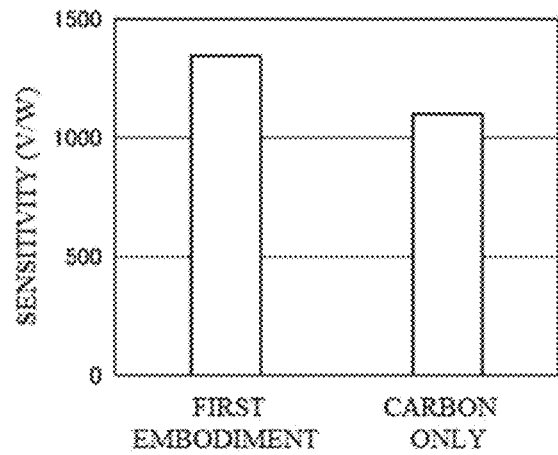
FIG. 5 is a graph showing a comparison between a sensitivity of the optical sensor according to the first embodiment and a sensitivity of an optical sensor using only carbon as an infrared absorbing film.

FIG. 5 is a graph showing a comparison between a sensitivity of the optical sensor according to the first embodiment and a sensitivity of the optical sensor using only carbon as the infrared absorbing film. In FIG. 5, a vertical axis represents a sensitivity (V/W). The sensitivities of the optical sensors are measured based on a detected voltage with respect to infrared light (W/m²) irradiated by a thermal light source (filament). The measurement was performed using SA 10510 8M3 (manufactured by Cal Sensors Inc.) as a distance of 7 cm between the thermal light source and the optical sensor at a voltage of 2.2 V and a current of 1.1 A.

Referring to FIG. 5, the sensitivity of the optical sensor according to the first embodiment is 22% higher than the sensitivity of the optical sensor using only carbon as the infrared absorbing film.

Second Embodiment

Figure 6:
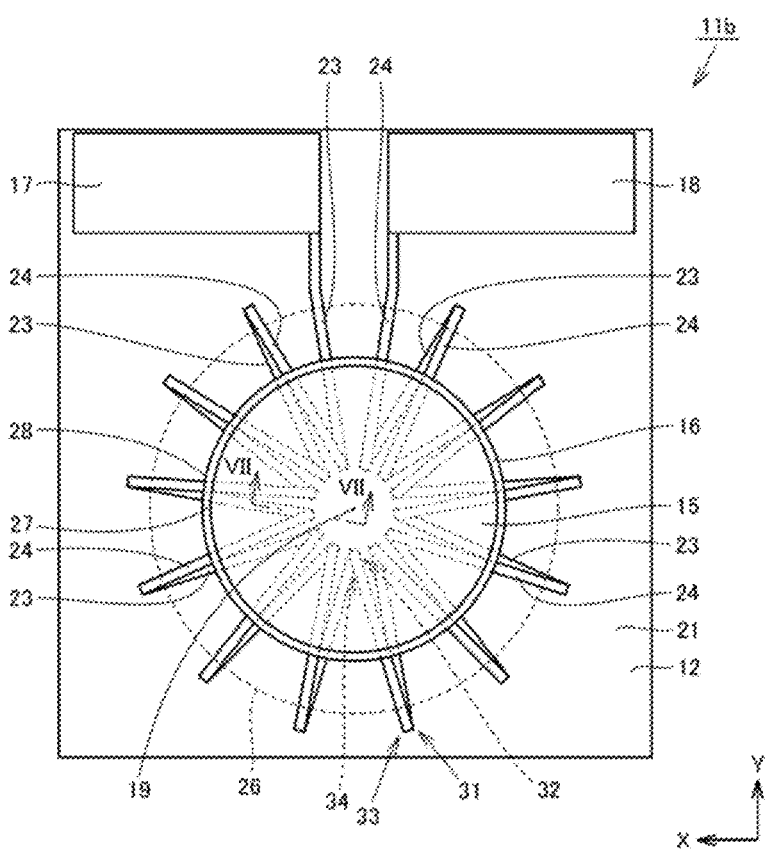
FIG. 6 is a schematic plan view of an appearance of an optical sensor according to a second embodiment of the present disclosure.
Figure 7:
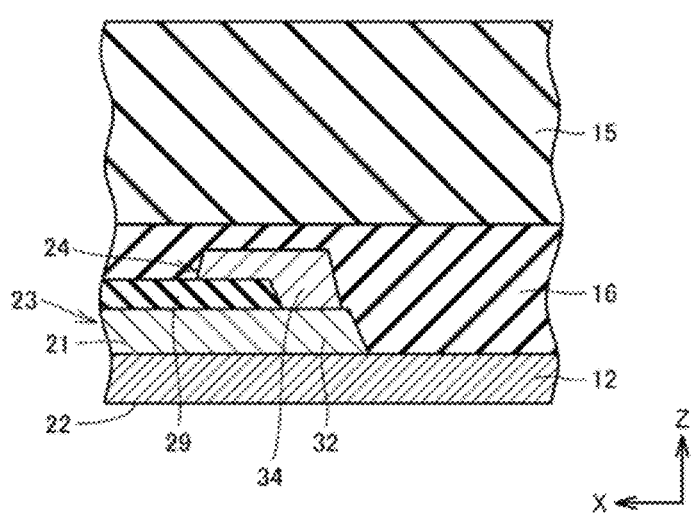
FIG. 7 is a schematic cross-sectional view of the optical sensor according to the second embodiment showing a cross-section taken along line VII-VII in FIG. 6.

A second embodiment which is another embodiment will be described. FIG. 6 is a schematic plan view of an appearance of an optical sensor according to the second embodiment of the present disclosure. FIG. 7 is a schematic cross-sectional view of the optical sensor of the second embodiment showing a cross-section taken along line VII-VII in FIG. 6. The optical sensor according to the second embodiment substantially has the same configuration as that of the first embodiment and has the same effects. However, the optical sensor of the second embodiment is different from that of the first embodiment in a configuration for connecting the p-type material layers and the n-type material layers to each other, that is, in configurations of first region 31, second region 32, third region 33, and fourth region 34.

An optical sensor 11b according to the second embodiment will be described with reference to FIGS. 6 and 7. Each of the plurality of p-type material layers 23 includes first region 31 overlapping heat sink 14 and second region 32 overlapping infrared absorbing film 15 as viewed in a direction perpendicular to first main surface 21. Each of the plurality of n-type material layers 24 includes third region 33 overlapping heat sink 14 and fourth region 34 overlapping infrared absorbing film 15 in the direction perpendicular to first main surface 21. First region 31 and third region 33 overlap heat sink 14 as viewed in the direction perpendicular to first main surface 21 and are in ohmic contact with each other. Second region 32 and fourth region 34 overlap infrared absorbing film 15 as viewed in the direction perpendicular to first main surface 21 and are in ohmic contact with each other. In regions where p-type material layers 23 and n-type material layers 24 are not in ohmic contact with each other, an insulating film (interlayer insulating film) 29 is disposed between p-type material layers 23 and n-type material layers 24.

Second regions 32 of p-type material layers 23 and fourth regions 34 of n-type material layers 24 are located in region RE which is a region of 30% or more and 80% or less of radius R15 of infrared absorbing film 15 from center 19 of infrared absorbing film 15 in a radial direction. Such a configuration also allows optical sensor 11b to have an improved sensitivity. In this case, p-type material layers 23 and n-type material layers 24 can be easily disposed in a concentrated manner on first main surface 21 without interposing a member between p-type material layers 23 and n-type material layers 24. Therefore, the number of p-type material layers 23 and the number of n-type material layers 24 can be increased to facilitate an increase in the output.

Third Embodiment

Figure 8:
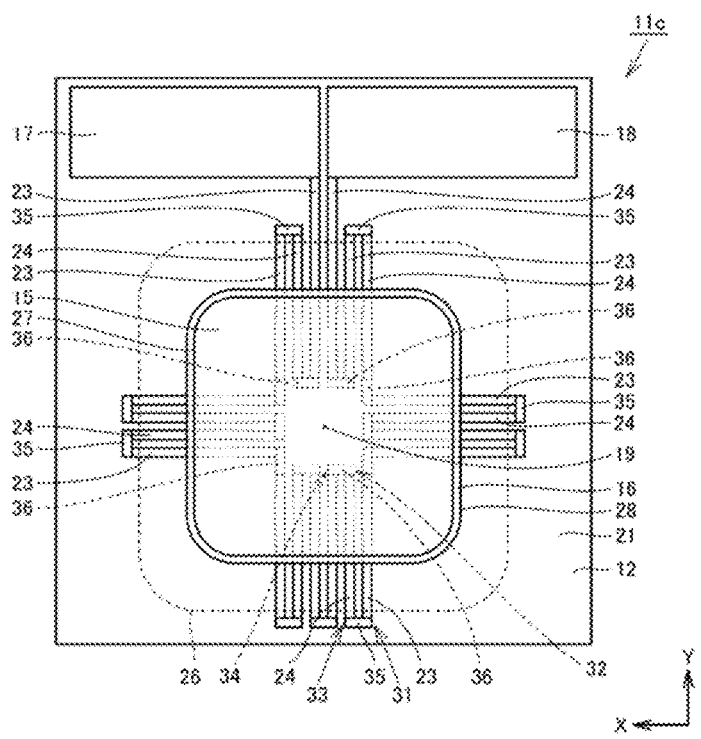
FIG. 8 is a schematic plan view of an appearance of an optical sensor according to a third embodiment of the present disclosure.

A third embodiment which is another embodiment will be described. FIG. 8 is a schematic plan view of an appearance of an optical sensor according to the third embodiment of the present disclosure. The optical sensor according to the third embodiment substantially has the same configuration as that of the first embodiment and has the same effects. However, the optical sensor according to the third embodiment is different from that of the first embodiment in the outer shape and the like of infrared absorbing film 15.

Referring to FIG. 8, in an optical sensor 11c according to the third embodiment, infrared absorbing film 15 has a rectangular outer shape as viewed in a direction perpendicular to first main surface 21. Specifically, the four corners of the rectangular outer shape are rounded. P-type material layers 23 and n-type material layers 24 are disposed such that the longitudinal directions thereof are parallel to a direction in which a side of infrared absorbing film 15 extends or to a direction perpendicular to the direction in which the side of infrared absorbing film 15 extends. Specifically, p-type material layers 23 and n-type material layers 24 are disposed such that the longitudinal directions thereof are parallel to the X direction or the Y direction.

Second regions 32 of p-type material layers 23 and fourth regions 34 of n-type material layers 24 are located in region RE which is a region of 30% or more and 80% or less of radius R15 of infrared absorbing film 15 from center 19 of infrared absorbing film 15 in a radial direction. In this case, the radial direction of rectangular infrared absorbing film 15 is an outward direction from center 19. Radius R15 of rectangular infrared absorbing film 15 is obtained as follows when Wx15 is a width of infrared absorbing film 15 in the X direction and Wy15 is a width of infrared absorbing film 15 in the Y direction.

$$R15=(Wx15+Wy15)/4$$

Such a configuration also allows improvement in the sensitivity of optical sensor 11c. In a case where support layer 12 has a rectangular shape as viewed in the direction perpendicular to first main surface 21, an region on first main surface 21 is effectively utilized to form large temperature differences in the longitudinal directions of strip-shaped p-type material layers 23 and the longitudinal directions of strip-shaped n-type material layers 24. Therefore, the sensitivity can be further improved.

OTHER EMBODIMENTS

In the above-described embodiments, the resin includes an epoxy resin, but the resin is not limited thereto. The resin may include other resins such as a phenol resin, a melamine resin, and a polyurethane resin.

The size of the insulating film is larger than the size of the infrared absorbing film in the above embodiments, but the size is not limited thereto. The size of the insulating film may be the same as the size of the infrared absorbing film. That is, as viewed in the direction perpendicular to the first main surface, the infrared absorbing film may be configured to completely cover the insulating film. Furthermore, the infrared absorbing film may be larger than the insulating film.

In the above-described embodiments, the plurality of p-type material layers, the plurality of n-type material layers, or both the plurality of p-type material layers and the plurality of n-type material layers may be formed of SiGe having at least one of a nanocrystal structure having a grain size of 3 nm to 200 nm or an amorphous structure. In this manner, the thermoelectric conversion efficiency can be improved. Therefore, the sensitivity can be improved.

The grain size of the crystal was measured by observation of a transmission electron microscope (TEM) image. The observation was performed using JEM-2100F (manufactured by JEOL Ltd.) as an apparatus at an acceleration voltage of 200 kV. A diameter of electronic probe was set to 0.2 nm, and as EDX mapping conditions, the number of pixels was set to 256 pixels 256 pixels, a Dwell time was set to 0.5 ms/pixel, and the number of integrations was set to 15.

The SiGe, which is a constituent material of the p-type material layers and the n-type material layers, may be formed as follows. For example, SiGe having an amorphous structure may be subjected to heat treatment at a temperature of, for example, about 500° C. to form a nanocrystal structure in a portion thereof. In addition, the SiGe may be polycrystal. Such a polycrystalline SiGe is also suitably used in the optical sensor of the present disclosure. A crystallization rate of the polycrystal in the optical sensor of the present disclosure is 99% or more. The crystallization rate was measured in the following manner. HORIBA LabRam HR-PL was used as an apparatus. As measurement conditions, a laser wavelength was set to 532 nm and a laser power was set to 2.5 mW. As an analysis condition, a peak around 400 cm$^{-1}$ was analyzed. In the analysis, a Gaussian function and a pseudo-Voigt function were fitted. The Gaussian function G (x) is expressed by the following equation shown in Math. 2.

$$G(x) = A_g \exp\left(-\frac{4\ln 2}{W_g^2}(x - x_g)^2\right) \qquad \text{[Math. 2]}$$

The pseudo-Voigt function F (x) is expressed by the following equation shown in Math. 3.

$$F(x) = A_F \frac{m}{\pi}\left[\frac{W_f}{(x - x_f)^2 + W_f^2}\right] + A_F \frac{1 - m}{\sqrt{2\pi W_f}} \exp\left[-\frac{(x - x_f)^2}{2W_f^2}\right] \qquad \text{[Math. 3]}$$

In the parameters A$_g$, W$_g$, and x$_g$ of Gaussian function G (x), an initial value of x$_g$ was set to 400 cm$^{-1}$. In the parameters A$_F$ W$_f$, x$_f$, and m of pseudo-Voigt function F (x), an initial value of x$_f$ was set to 380 cm$^{-1}$, and m was set to 0.5. Each of parameters was optimized by the least squares method, and each of the pseudo-Voigt function and the Gaussian function was integrated to obtain an area. The crystallization rate was calculated by an equation of crystallization rate=area derived using the pseudo-Voigt function/(area derived using the pseudo-Voigt function+area derived using the Gaussian function), considering that the area derived using the Gaussian function corresponds to amorphous structure and the area derived using the pseudo-Voigt function corresponds to crystalline structure.

It should be understood that the embodiments disclosed in the present disclosure are merely illustrative and non-restrictive in every respect. The scope of the present disclosure is defined by the claims rather than the description above, and is intended to include any modifications within the scope and meaning equivalent to the claims.

What is claimed is:

1. An optical sensor comprising:

a support layer having a first main surface and a second main surface located opposite the first main surface in a thickness direction;

a thermoelectric-conversion material section including a plurality of p-type material layers and a plurality of n-type material layers, each of the plurality of p-type material layers having a strip shape, being formed of SiGe having p-type conductivity, and being configured to convert thermal energy into electric energy, each of the plurality of n-type material layers having a strip shape, being formed of SiGe having n-type conductivity, and being configured to convert thermal energy into electric energy, the thermoelectric-conversion material section being disposed on the first main surface;

a heat sink disposed on the second main surface and having a recess on an inner side as viewed in a direction perpendicular to the first main surface;

a light absorbing film disposed so as to overlap the recess as viewed in the direction perpendicular to the first main surface; and an insulating film disposed between the thermoelectric-conversion material section and the light absorbing film, wherein each of the plurality of p-type material layers includes a first region overlapping the heat sink and a second region overlapping the light absorbing film as viewed in the direction perpendicular to the first main surface, each of the plurality of n-type material layers includes a third region overlapping the heat sink and a fourth region overlapping the light absorbing film as viewed in the direction perpendicular to the first main surface, the plurality of p-type material layers and the plurality of n-type material layers are alternately disposed in series such that the first regions are electrically connected to the third regions and the second regions are electrically connected to the fourth regions, and the light absorbing film includes 60 mass % to 95 mass % of carbon, and 5 mass % to 40 mass % of a resin.

2. The optical sensor according to claim 1, wherein the light absorbing film has a thermal conductivity of 1 W/mK or less.

3. The optical sensor according to claim 1, wherein the resin includes an epoxy resin.

4. The optical sensor according to claim 1, wherein the light absorbing film has a thickness of 2 μm to 7 μm.

5. The optical sensor according to claim 1, wherein the light absorbing film has a circular outer shape as viewed in the direction perpendicular to the first main surface, and the plurality of p-type material layers and the plurality of n-type material layers are radially disposed.

6. The optical sensor according to claim 5, wherein the second regions and the fourth regions are located in a region of 30% or more and 80% or less of a radius of the light absorbing film from a center of the light absorbing film in a radial direction.

7. The optical sensor according to claim 1, wherein the light absorbing film has a rectangular outer shape as viewed in the direction perpendicular to the first main surface, and the plurality of p-type material layers and the plurality of n-type material layers are disposed such that longitudinal directions thereof are parallel to a direction in which a side of the light absorbing film extends or to a direction perpendicular to the direction in which the side of the light absorbing film extends.

8. The optical sensor according to claim 1, wherein the first regions are electrically connected to the third regions through first connection portions having conductivity, and the second regions are electrically connected to the fourth regions through second connection portions having conductivity.

9. The optical sensor according to claim 1, wherein the first regions of the plurality of p-type material layers and the third regions of the plurality of n-type material layers overlap each other as viewed in the direction perpendicular to the first main surface and are connected in ohmic contact with each other, and the second regions of the plurality of p-type material layers and the fourth regions of the plurality of n-type material layers overlap each other as viewed in the direction perpendicular to the first main surface and are connected in ohmic contact with each other.

10. The optical sensor according to claim 1, wherein the plurality of p-type material layers, the plurality of n-type material layers, or both the plurality of p-type material layers and the plurality of n-type material layers include SiGe having at least one of a nanocrystal structure having a grain size of 3 nm to 200 nm or an amorphous structure.

11. The optical sensor according to claim 1, wherein the SiGe is a polycrystal.

* * * * *